Aug. 6, 1929.     F. TOLKIEN     1,723,449

SLIDE VALVE GEAR FOR RECIPROCATING STEAM ENGINES

Filed Feb. 16, 1925     9 Sheets-Sheet 2

Inventor
F. Tolkien
By Marks & Clerk
Attys.

Aug. 6, 1929.  F. TOLKIEN  1,723,449
SLIDE VALVE GEAR FOR RECIPROCATING STEAM ENGINES
Filed Feb. 16, 1925   9 Sheets-Sheet 3

Inventor
F. Tolkien
By Marks & Clerk
Attys.

Aug. 6, 1929.  F. TOLKIEN  1,723,449
SLIDE VALVE GEAR FOR RECIPROCATING STEAM ENGINES
Filed Feb. 16, 1925   9 Sheets-Sheet 4

Inventor
F. Tolkien
By Marks&Clerk

Aug. 6, 1929.　　　　F. TOLKIEN　　　　1,723,449
SLIDE VALVE GEAR FOR RECIPROCATING STEAM ENGINES
Filed Feb. 16, 1925　　　9 Sheets-Sheet 5

Aug. 6, 1929. F. TOLKIEN 1,723,449
SLIDE VALVE GEAR FOR RECIPROCATING STEAM ENGINES
Filed Feb. 16, 1925 9 Sheets-Sheet 6

Aug. 6, 1929.  F. TOLKIEN  1,723,449

SLIDE VALVE GEAR FOR RECIPROCATING STEAM ENGINES

Filed Feb. 16, 1925   9 Sheets-Sheet 8

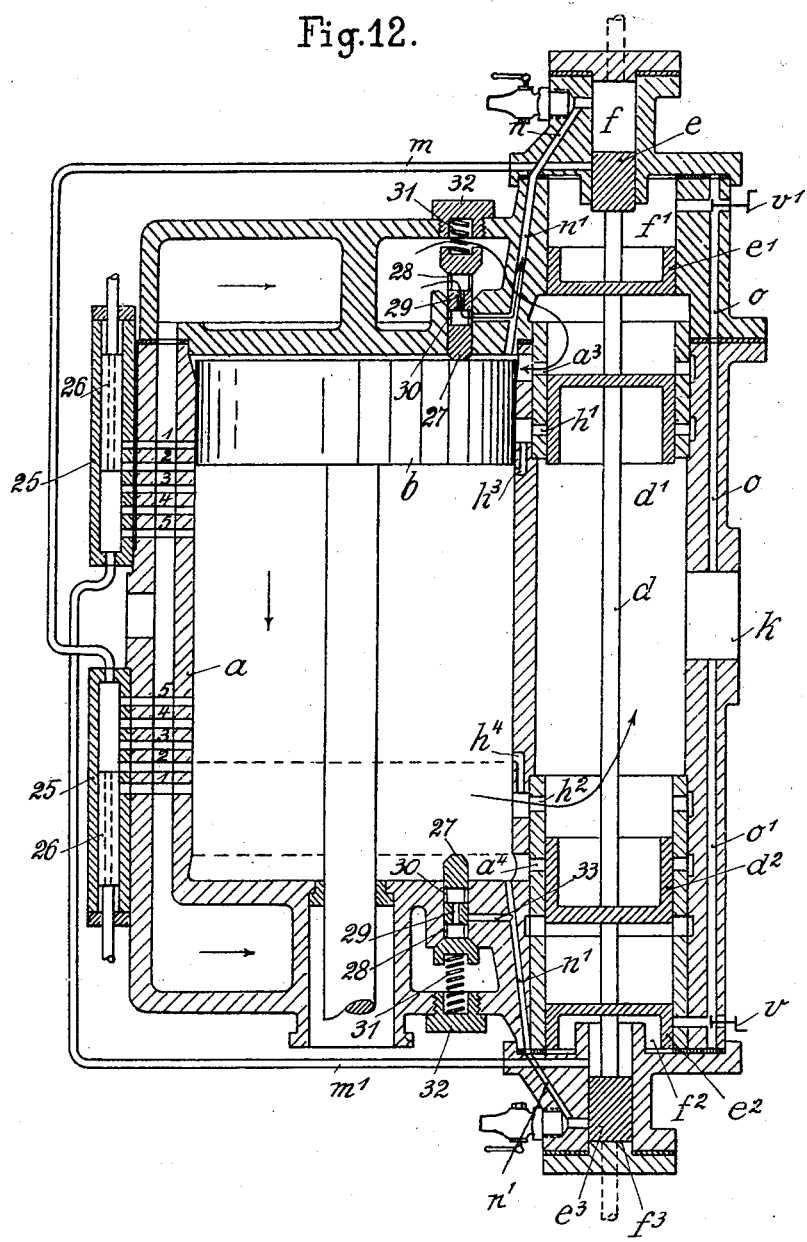

Patented Aug. 6, 1929.

1,723,449

UNITED STATES PATENT OFFICE.

FRITZ TOLKIEN, OF PILLAU, GERMANY.

SLIDE-VALVE GEAR FOR RECIPROCATING STEAM ENGINES.

Application filed February 16, 1925, Serial No. 9,631, and in Germany February 28, 1924.

For controlling reciprocating steam engines it has already been proposed to provide rodless slide valves, which are operated by the steam from the power cylinder. It has also been proposed with such slide valves operated by means of double differential pistons to admit, after initiating the slide valve movement by means of the steam taken from the power cylinder, live steam into the reversing space of the slide valve through the piston of the power cylinder, with the object of completing the movement of the slide valve, which would otherwise not be completed, owing to the pressure of the steam taken from the power cylinder being too low.

In contradistinction to these known methods of slide valve control the present invention consists substantially in this, that the slide valve movement is initiated by causing steam from the power cylinder to act on the larger differential piston and completing it by thereupon causing live steam to act on the smaller differential piston, the two pistons working in separate reversing spaces.

This splitting up of the slide valve movement by using a separate driving fluid for each stage of the movement makes it possible to obtain a series of effects, which cannot be realized with the rodless slide valves used hitherto.

Figure 1:
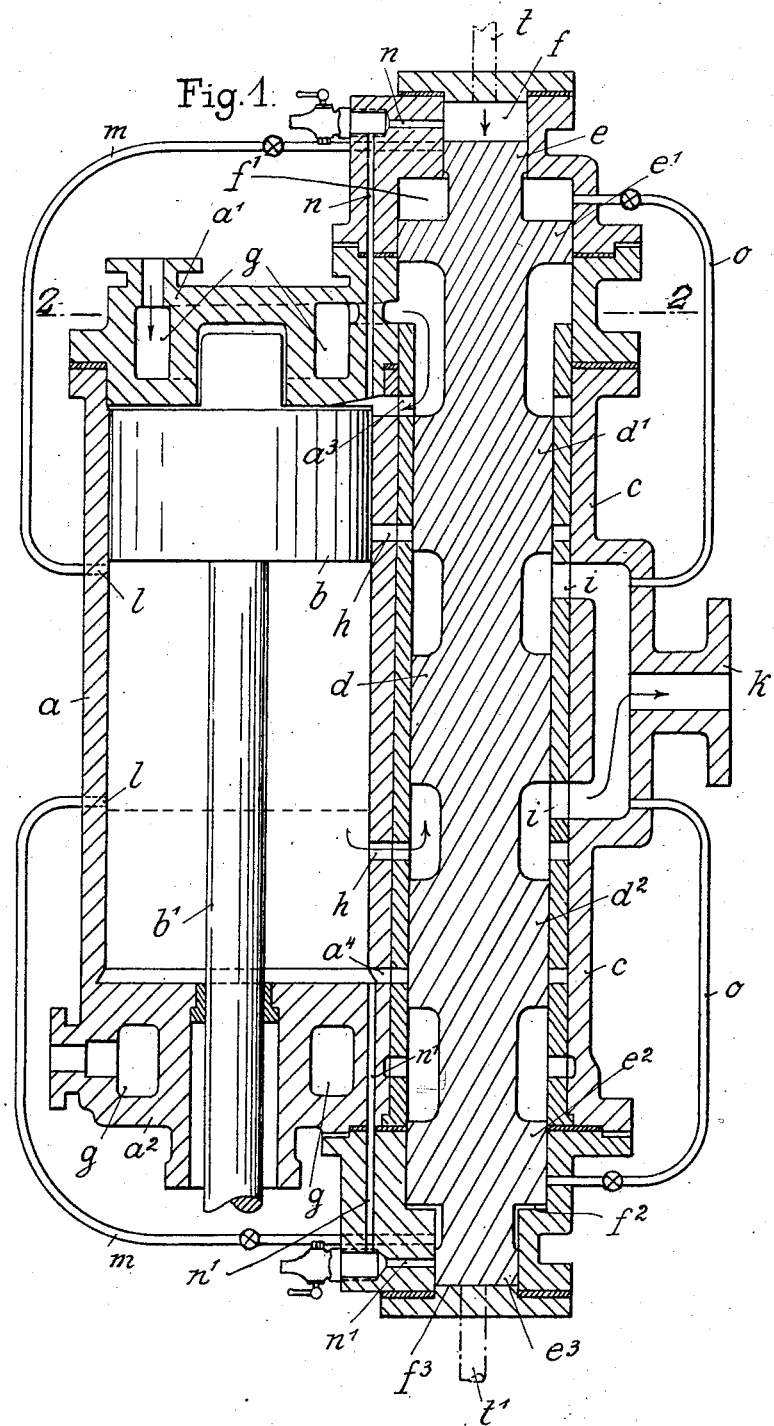
Figure 2:
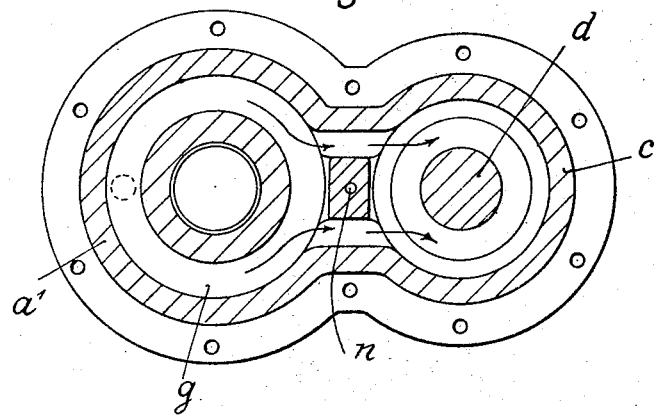
Figure 3:
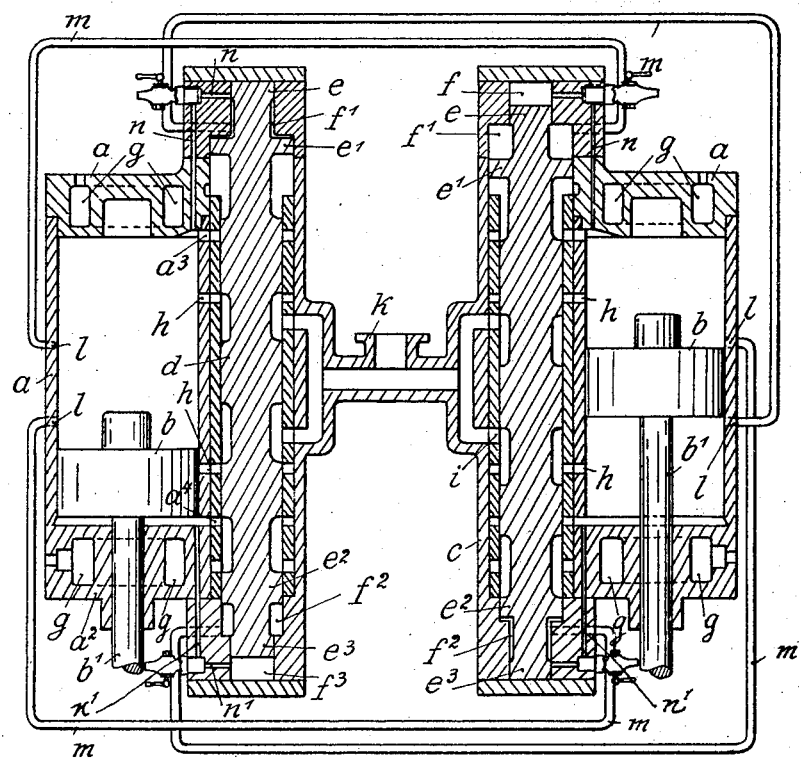
Figure 4:
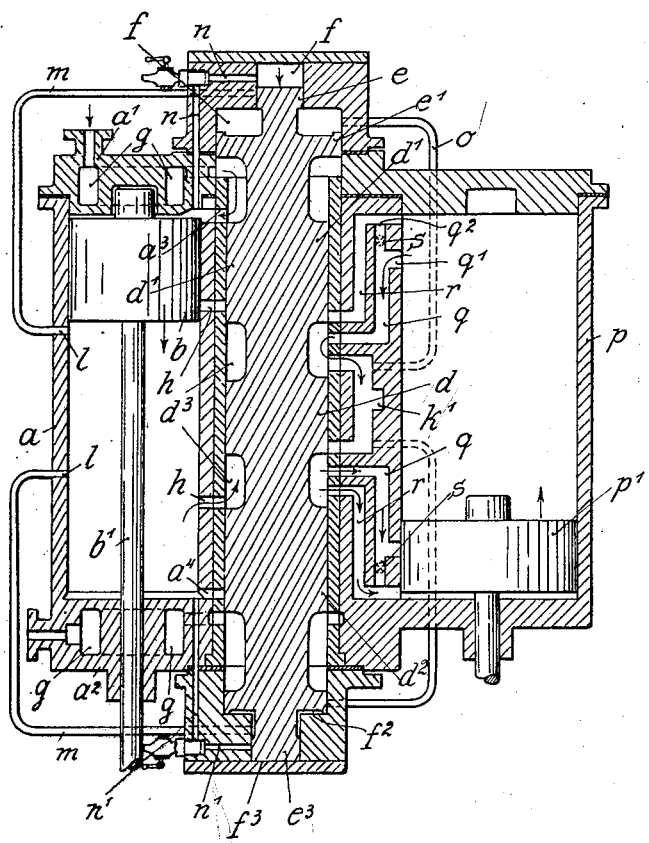
Figure 5:
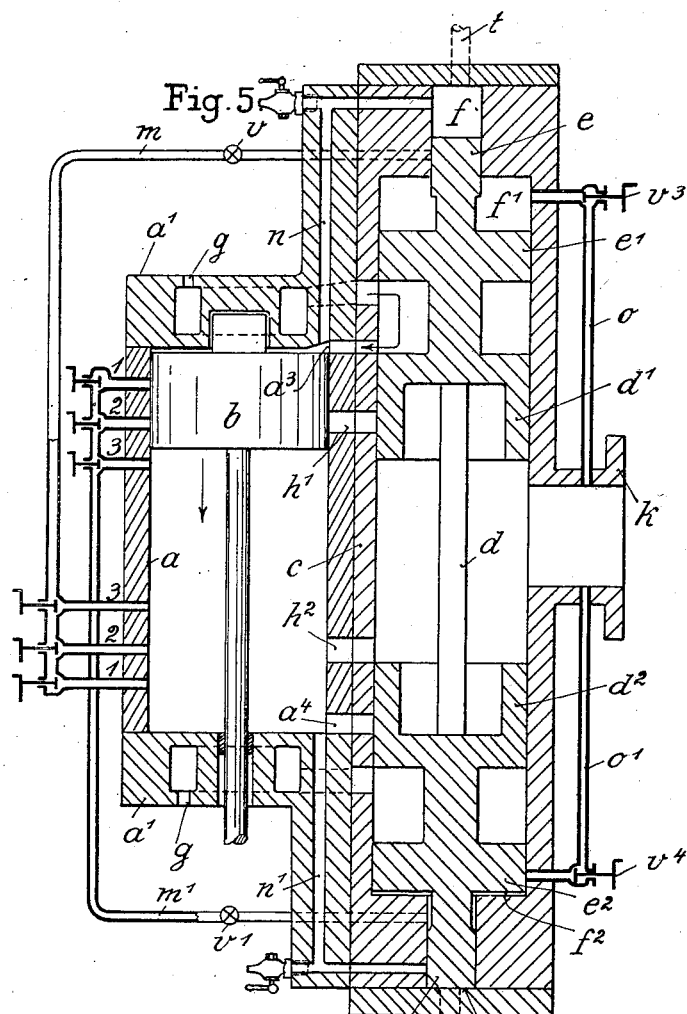
Figure 6:
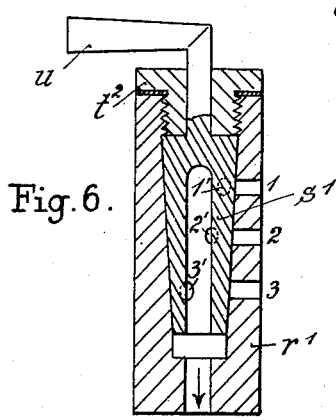
Figure 7:
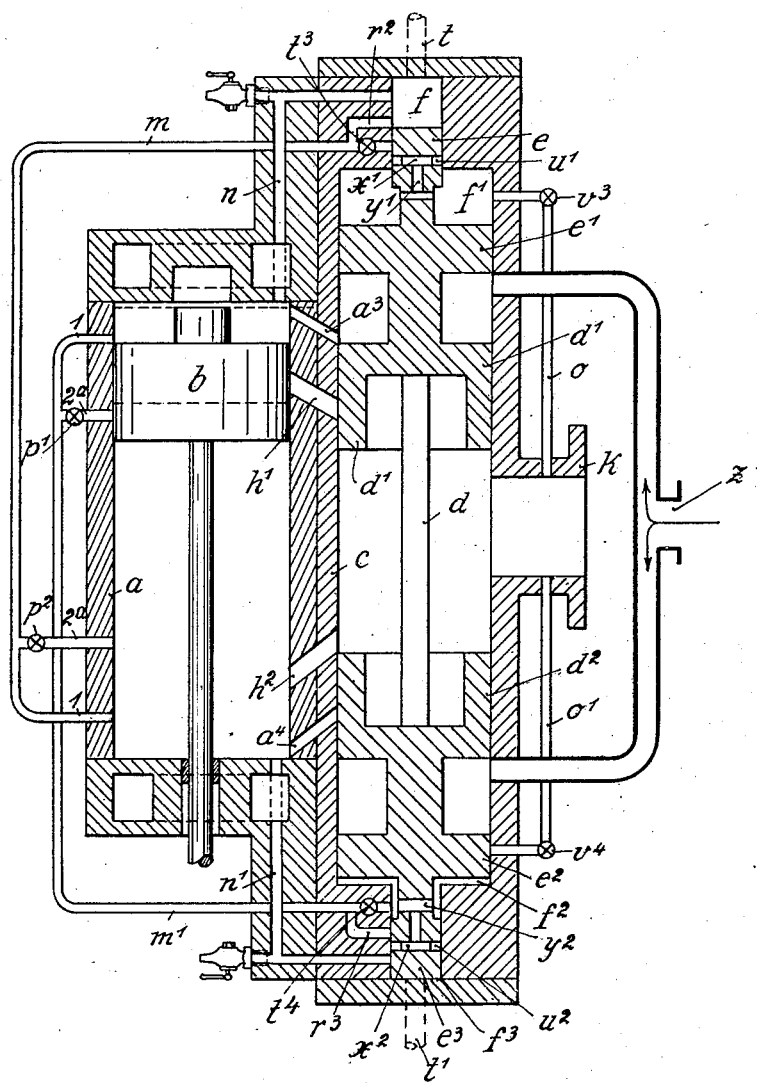
Figure 8:
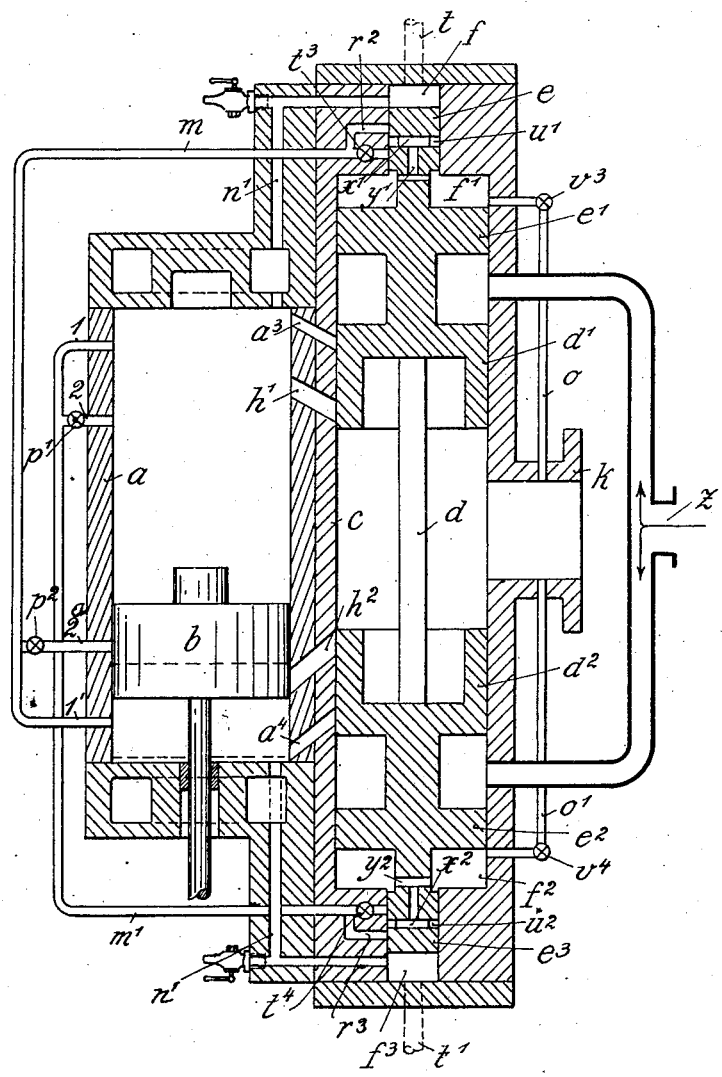
Figure 9:
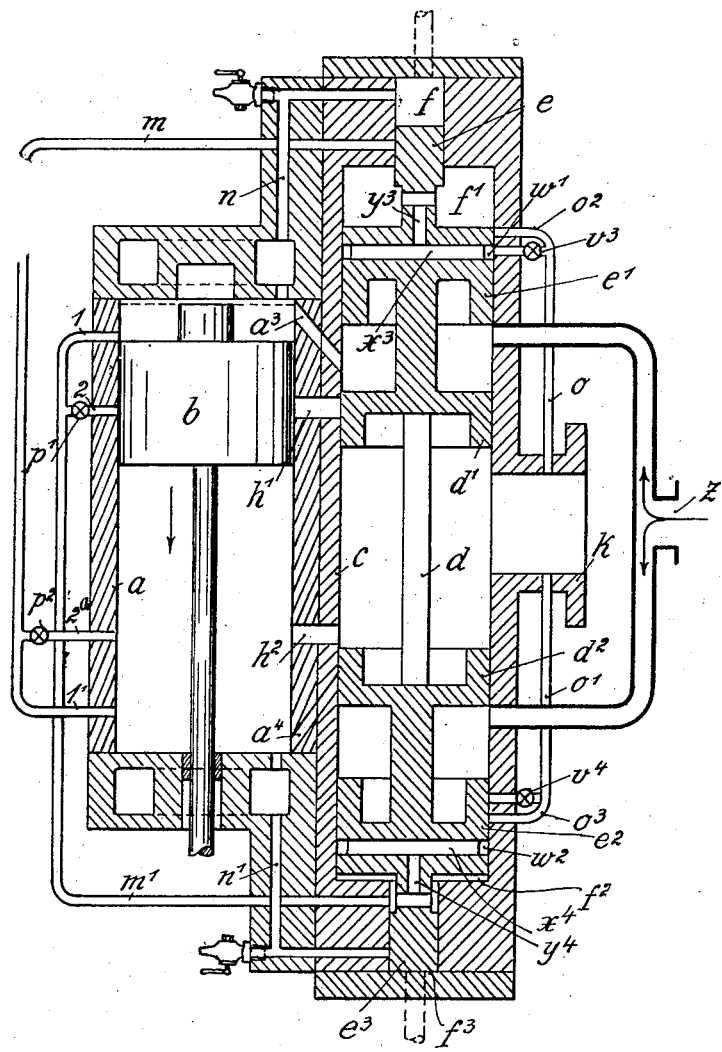
Figure 10:
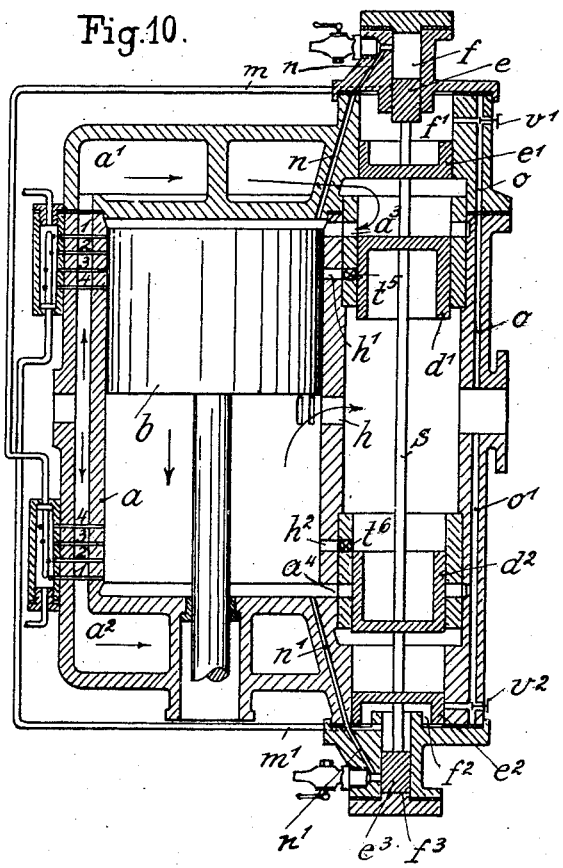
Figure 11:
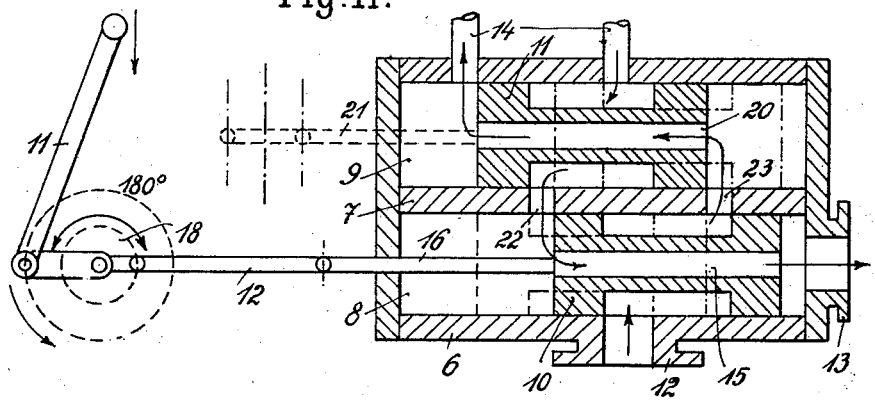

The accompanying drawings illustrate the invention with reference to several constructional examples:

Fig. 1 being a section through the new slide valve gear,

Fig. 2 a section on line 2—2 of Fig. 1,

Fig. 3 a constructional form for twin steam engines having their cranks displaced by 90°, Fig. 4 a constructional form for twin steam engines having their cranks displaced by 180°, Fig. 5 a section of a constructional form, in which the slide valve also regulates the expansion, Fig. 6 a detail in section of the constructional form shown in Fig. 5, Figs. 7 and 8 modifications of the form shown in Fig. 5, Fig. 9 another modified form in section, Fig. 10 a similar section through another constructional form, Fig. 11 a section through the reversing device belonging to the rodless slide valve gear according to the present invention and Fig. 12 another constructional form of the invention.

In the power cylinder $a$ (Fig. 1) the piston $b$ and the piston rod $b^1$ are slidable; adjacent to the cylinder $a$ is the slide valve casing $c$ containing the piston valve $d$. At each end of the piston valve is a differential piston $e$, $e^1$ and $e^2$, $e^3$ respectively, which are adapted to operate in the reversing spaces $f$, $f^1$ and $f^2$, $f^3$. Steam is admitted at both ends of the cylinder $a$ through the passages $g$ in the cylinder ends $a^1$, $a^2$, such that, with the slide valve in the position shown, the steam enters the valve box at the top between the large differential piston $e^1$ and the part $d^1$ of the slide valve and passes by the shortest path through the port $a^3$ behind the power piston $b$. The steam in front of the piston escapes through the port $h$ in the valve casing between the two parts $d$ and $d^2$ of the slide valve and passes through the port $i$ in the valve casing to the steam outlet $k$.

With the slide valve and piston in the position shown the latter is driven downwards in the direction of the arrow by the steam entering behind it. At the end of its downward movement, indicated by the broken line in Fig. 1, the piston $b$ uncovers a port $l$ in the wall of the cylinder, so that steam can pass out of this port through the steam pipe $m$ into the reversing space $f^2$ behind the larger differential piston $e^2$; in consequence the slide valve is moved slightly upwards, so that the inlet port $a^3$ is closed, and the inlet port $a^4$ at the other end of the cylinder is opened. The two ports $a^3$ and $a^4$ are now each in communication through a passage $n$, $n^1$ with the reversing spaces $f$, $f^3$ of the slide valve. On the movement just described taking place, live steam will enter through $n^1$ under the slightly raised differential piston $e^3$ and will complete the movement of the slide valve. This communication remains uninterrupted during the following stroke of the piston (upward stroke), so that the slide valve is held immovable in the position it has reached.

The reversing spaces $f^1$ and $f^2$ are exhausted to the steam outlet through the pipes $o$, which are connected to the reversing spaces in such a manner as to be only uncovered by the large differential pistons $e^1$, $e^2$, when the inlet pipes $m$ are closed by the smaller differential pistons $e$ or $e^3$. Thus at the commencement of the reversal described the reversing space $f^1$ is exhausted, but the reversing space $f$ is still under pressure, which is the same as that acting on the lower side of the large differential piston $e^2$, so that, owing to the difference in size between the two pistons $e$ and $e^2$, the displacement of the slide valve can be initiated, the port $a^3$ being closed and the port $a^4$ opened. While live steam will thereupon flow behind the small differential piston $e^3$, the steam in the reversing space $f$ can escape through the passage $n$ with the steam from the cylinder through the port $h$.

The passage $n$ communicates with the space $f$, the arrangement being such that a small amount of steam remains in it, which is compressed and forms a cushion for easing the hammer of the slide valve.

The arrangement of the pipes $o$, $m$ and the passages $n$, $n^1$ allows the reversing spaces of the slide valve to be trained so as to ensure safety in working. According to the invention these pipes and passages are so connected up to the reversing spaces that the effects described at the beginning of the specification are realized. The position of the ports $l$ in the wall of the steam cylinder can be so determined by calculation or trial that for a determined working pressure and a determined, uniform load at the piston speed thus obtained the slide valve will open so that the power piston will receive full steam pressure when at the dead centre. Should the working pressure or load vary, the slide valve movement will be in no way endangered. The larger differential pistons $e^1$, $e^2$ are given such a cross-sectional area that at the lowest admissible or probable cylinder pressure the steam slide valve must lift. In accordance with the invention the cylinder steam pipes $m$ are so connected to the large reversing spaces $f^1$, $f^2$ that immediately after the lifting of the slide valve they are cut off by the small differential pistons $e$, $e^3$. The exhaust pipes $o$ are so connected to the reversing spaces $f^1$, $f^2$ that approximately at the same time as or at any rate immediately after the closing of the pipes $m$ the reversing spaces $f^1$, $f^2$ are exhausted. By this means the movement of the slide valve, which receives a powerful impulse from the steam acting on the large differential piston $e^2$ for giving it an initial lift is immediately checked owing to the steam supply to the piston $e^2$ being cut off by the small piston $e^3$, the space $f^3$ being put into communication with the steam outlet $k$ through the pipe $o$ and the cushioning action of the steam trapped in the reversing spaces $f$, $f^1$, the check being greater, the more slowly the power piston approaches its dead centre. If the piston speed is below the normal and steam would be admitted too soon to the reversing space $f$, particularly in the case of high speed engines where the ports $l$ in the wall of the steam cylinder are placed more towards the middle of the cylinder than in the construction shown in Figure 1, the checking of the movement of the slide valve referred to above will prevent any detrimental action due to the steam being admitted to the differential piston $e^2$ too soon in view of the longer time taken for the piston $b$ to reach its dead centre. In such cases the steam port $a^4$ is only opened slightly and the live steam is wire-drawn, so that the pressure of the steam, which enters the reversing space $f^3$ through the passage $n^1$, only rises to the full pressure required for moving the slide valve after an appreciable time. The speed of the initial movement of the slide valve during its reversal will thus be proportional to the speed of the piston.

The arrangement of the passages $n$ and $n^1$ results in the motion of the slide valve by the small differential piston being also directly dependent on the piston speed; as the piston speed increases, the space to be filled with live steam is diminished more rapidly and the live steam required for the reversing space $f$ or $f^3$ reaches its pressure more rapidly for moving the slide valve, as the piston speed diminishes the space is diminished correspondingly more slowly and the pressure is reached later, so that the relation between piston speed and slide valve motion always remains the same during this second movement caused by the small differential piston.

For the rest by the provision of throttle valves in the pipes $m$ and $o$ a wide range of regulation may be effected by hand or automatically.

In Fig. 4 the invention is shown as applied to a compound steam engine having its cranks relatively displaced by 180°. In this case the displacement of the slide valve is effected in the same manner as above, viz from the high pressure cylinder, which is connected in the same way to the reversing spaces $f$, $f^1$, $f^2$, $f^3$ by the pipes $m$ and the passages $n$ and $n^1$. The two ends of the low pressure cylinder $p$ are each connected by the passages $q$ and $r$ to the two annular spaces $d^3$ of the slide valve $d$, which alternately receive the exhaust steam from the high pressure cylinder $a$. The passages $q$ of greater cross-sectional area have two openings $q^1$, $q^2$ giving into the low pressure cylinder and between the two a throttle valve $s$ or the like is provided in the passages $q$. On the piston $p^1$ closing the opening $q^1$, the steam can only escape through the opening $q^2$ to the exhaust $k^1$, as the passage $r$ is closed by the slide valve $d$. By adjusting the throttle valve $s$ any desired compression of the exhaust steam still remaining in the cylinder can thus be obtained in the cylinder on the exhaust side. The provision of the passage $r$ is necessary so that steam can enter behind the piston $p^1$, when the cock $s$ is nearly or completely closed.

An essential feature of this constructional form is, that the transfer of the steam from the high pressure to the low pressure cylinder and also the escape of the steam from the latter shall take place not through the reversing spaces, but through the annular recesses $d^3$ in the slide valve provided for this purpose, which, as shown in Fig. 4, finally convey the exhaust steam to the exhaust passage indicated at $k^1$. By this means in contradistinction to the known slide valve gears a cooling off of the reversing spaces by the cold exhaust steam is prevented, which would otherwise cause losses by condensation, when live steam enters the reversing spaces.

Fig. 3 shows a constructional form of the invention as applied to twin steam engines having the cranks relatively displaced by 90°. In this case each cylinder is provided with a separate slide valve. The steam pipes $m$ leading from the cylinders for initiating the slide valve motion are connected to the middles of the cylinders and lead to the reversing spaces $f^1$ and $f^2$ of the slide valve belonging to the other cylinder. The pipes $m$ are crossed over in the case of one of the cylinders for the purpose of correctly controlling the other slide valve so as to correspond to the crank displacement between the two cylinders.

In order that the engine shall operate correctly, however, the escape pipes $o$ are omitted and the pipes $m$ may not be covered by the slide valve in its movement, but are always in communication with their reversing spaces $f^1$ and $f^2$. The operation differs from that described with reference to Figs. 1 and 4 as follows:

When with the position as shown in Fig. 3 the piston $b$ of the right-hand cylinder moves further downward, it will eventually also open the lower port $l$, so that steam can enter through the upwardly extending pipe $m$ into the reversing space $f^1$ of the left-hand slide valve. As, however, the reversing space $f^2$ of this slide valve is under the same steam pressure, these pressures balance one another and the left-hand slide valve remains stationary in the position shown, as it is held there by the live steam in the reversing space $f^3$.

When the right-hand piston is in the dead centre, the left-hand piston will be in the middle position, in which it has uncovered the lower port $l$, so that through $l$ and the pipe $m$ steam is admitted to the reversing space $f^2$ of the right-hand slide valve. The reversing space $f^1$ of this slide valve has in the meantime been exhausted through the upper pipe $m$ and the upper port $l$ of the left-hand cylinder to the exhaust side of the left-hand power piston $b$. The right-hand slide valve will thereupon move upwards, owing to the difference in superficial area of the reversing pistons $e^2$ and $e$. This will cause live steam to enter in the manner described through the passage $n^1$ under the reversing piston $e^3$ into the reversing space $f^3$ of the right-hand slide valve, so that this slide valve will finish its movement.

The movement of the slide valves is thus in this case initiated by working steam taken from the other cylinder not belonging to the slide valve, which the completion of the movement of the slide valves and more particularly the holding of the slide valves in their extreme positions is effected in the same manner as described above.

The reversal of the steam engine, i. e. the reversal of the direction of revolution, can be effected in a simple manner with the rodless slide valve shown, by live steam pipes $t$ and $t^1$ shown by dot and dash lines in Fig. 1, which are capable of being closed by cocks, being connected to the reversing spaces $f$ and $f^3$. When the piston is stationary in any middle position, one or the other live steam pipe $t$ may be opened so as to displace the slide valve $d$ in such a manner that the engine will start in the desired direction of revolution. It is necessary first to ascertain the exact position of the crank of the engine, as to each position of the piston there correspond two crank positions, so that, for causing the engine to run in the desired direction, according to the position of the crank the steam must be admitted to one side or other of the piston. The reversing steam, which is introduced through one or other of the live steam pipes $t$ or $t^1$ into one of the reversing spaces $f$ or $f^3$, passes straight through the passage $n$ or $n^1$ to the power cylinder, causing the engine to start at once.

In the vertical engine shown in Fig. 1 the upper larger differential piston $e^1$ has a greater diameter than the lower piston $e^2$ for taking up the weight of the slide valve.

The slide valves described below are so constructed that they regulate the expansion in the corresponding cylinder. This effect is obtained substantially by an arrangement of the pipes $m$, $m^1$ for initiating the movement of the slide valve, which arrangement differs from those described above.

The constructional form of slide valve gear shown in Fig. 5 is in its main features the same as that shown in Fig. 1, so that it will not be necessary to enumerate the separate parts again, all of which bear the same references as in Fig. 1. It need only be mentioned that the middle portion $d$ of the slide valve is in Fig. 3 replaced by a rod $d$ for reducing the weight of the slide valve and for facilitating the assembling of the valve gear.

As in Fig. 1 the pipes $m$, $m^1$ convey steam from the cylinder to the reversing spaces $f^1$, $f^2$ for acting on the larger differential pistons $e^1$, $e^2$, while the reversing spaces $f$, $f^3$ receive steam through the passages $n$, $n^1$ for acting on the smaller differential pistons $e$ and $e^3$. The reversing spaces $f^1$, $f^2$ are exhausted through the pipes $o$, $o^1$, which lead to the exhaust branch $k$.

In the constructional form shown in Fig. 5 the pipes $m$ $m^1$ are crossed over and are connected to the steam cylinder through a number of valves and ports 1, 2, 3, which results in the arrangement acting as follows:—

With the piston and slide valve in the positions shown in Fig. 5 the live steam enters through the port $a^3$ above the piston $b$; the ports $h^1$ and $a^4$ are closed by the slide valve and the ports 1, 2 of the pipe $m^1$ are covered by the piston. Through the passage $n$ live steam enters the reversing space $f$ above the differential piston $e$ and prevents the slide valve moving. On the piston $b$ moving downwards in the direction of the arrow, steam is admitted to the pipe $m^1$ through one of the ports 1, 2 or 3, which will act on the larger differential piston $e^2$, so that the slide valve is raised rapidly owing to the difference in the cross-sectional area between the pistons $e$ and $e^2$, the steam admission port $a^3$ being rapidly and suddenly closed by the part $d^1$ of the slide valve. This sudden cutting off of the working steam, the importance of which may be assumed to be well known, can be effected with certainty according to the present invention, by the high pressure steam entering the pipe $m$ without being throttled through the opened valve 1, 2 or 3 as the case may be, which determines the cut-off. The other valves 1–3 are preferably closed.

Immediately after the port $a^3$ has been closed the pipe $m^1$ is closed by the differential piston $e^3$ and shortly afterwards the exhaust pipe $o^1$ is uncovered by the differential piston $e^2$, so that the steam can escape from the reversing space $f^2$, which can be further regulated in a very accurate manner by the throttling screw $v^4$ in the pipe $o^1$. By thus relieving the pressure on the piston $e^2$ and owing to the counter pressure acting on the piston $e$, the movement of the slide valve is retarded after the closing of the steam inlet port $a^3$. Should the reduction of pressure in the reversing space $f^2$ be too great and the counter pressure on the piston $e$ too high, the slide valve would be moved back. This, however, does no harm, for first of all the escape pipe $o^1$ would again be closed by the piston $e^2$ and the supply pipe $m^1$ to the reversing space $f^2$ opened by the piston $e^3$, while the steam inlet $a^3$ would remain closed. The working steam thus again entering the reversing space $f^2$ prevents any further backward movement of the slide valve.

When the piston $b$ has covered the exhaust port $h^2$, compression will take place in front of the piston at the bottom end of the cylinder, which will act through the passage $n^1$ in the reversing space $f^3$ on the piston $e^3$, so that the slide valve will be advanced in dependence on the piston speed so far that the inlet port $a^4$ will be uncovered to such an extent that live steam can enter through it, which will flow through the passage $n^1$ into the reversing space $f^3$, the slide valve passing from the closing position into the extreme position.

In this position the piston $e$ covers the passage $n$, so that a compression cushion is formed in the reversing space $f$, which cushions the slide valve movement.

It follows from the above without any further explanation that the cut-off of the cylinder is varied by opening one of the valves 1–3; the valve selected for this purpose is opened full, in order that the steam may act without being throttled on the slide valve for obtaining a quick cut-off.

The sole object of the regulating valves $v$ and $v^1$ in the pipes $m$ and $m^1$ is to regulate the slide valve movement or, by being completely closed, to bring the engine to rest.

For making it easier to select a definite value of the valves 1, 2 or 3 in the pipes $m$, $m^1$ for regulating the cut-off, which in the arrangement shown in Fig. 5 always requires the operation of several valves, the three ports or bores 1–3 (Fig. 6) communicate with a cock casing $r^1$ provided with corresponding bores, in which a plug $s^1$ with helically displaced bores $1^1$, $2^1$, $3^1$ is held by the screw cover $t^2$. The plug $s^1$ can be adjusted either by hand or by the governor by means of the handle $u$, so that steam can in any case pass only through one of the bores 1, 2 or 3 into the pipe $m$ connected to the bottom of the casing $r^1$. In one position of the plug all the bores 1–3 are closed, so that the engine will come to rest.

The slide valve gear shown in Figs. 7 and 8 differs as regards its construction from that just described, by the pipes $m$, $m^1$, which are also crossed over, being each connected to the cylinder by a bore 1 and a branch pipe $2^a$ at a certain distance therefrom containing a regulating valve $p^1$ and $p^2$ respectively. The pipes $m$, $m^1$ also communicate with the slide valve through interposed throttle valves $t^3$, $t^4$, in front of which an unthrottled passage $r^2$ and $r^3$ respectively branches off. The two small differential pistons $e$ and $e^3$ have circumferential grooves $u^1$ and $u^2$, with which communicate the bores $x^1$, $y^1$ and $x^2$, $y^2$, which open into the reversing spaces $f^1$ and $f^2$. The working steam is supplied through the pipe $z$.

The cut-off is in this example regulated substantially by the throttle valves $t^3$, $t^4$. When in Fig. 7 the piston $b$ has uncovered the port 1 of the pipe $m^1$, the working steam will flow out of the cylinder through the pipe $m^1$ into the reversing space $f^2$ in a manner determined by the throttle valve $t^4$, where it will act on the larger differential piston $e^2$. When the pressure in the reversing space $f^2$ has risen sufficiently, the slide valve is slightly raised by the piston $e^2$, until the circumferential groove $u^2$ coincides with the branch passage $r^3$. Unthrottled steam will then flow through the passage $r^3$, the circumferential groove $u^2$ and the bores $x^2$ and $y^2$ into the reversing space $f^2$ and will throw the slide valve into the cut-off position (Fig. 8), in which by the piston $e^3$ both the pipe $m^1$ with the throttle valve $t^4$ and the unthrottled branch passage $r^3$ are closed. Thus no steam can enter the reversing space $f^2$.

The second part of the slide valve stroke is caused to take place in the manner described in connection with Fig. 5, viz first by the compression pressure under the power piston $b$ acting through $n^1$ on the smaller differential piston $e^3$ and then, after the further movement of the slide valve and the uncovering of the steam inlet port $a^4$ effected thereby by live steam flowing behind the piston $e^3$, so that the slide valve is thrown into its extreme position.

By adjusting the throttle valves $t^3$, $t^4$ the cut-off may be extremely finely regulated, as these valves according to the way they are adjusted effect a quick or slow reversal of the slide valve.

As in the constructional forms of the invention shown in Figs. 7 and 8 the expansion is regulated solely by the throttle valves $t^3$, $t^4$ in the pipes $m$, $m^1$, the pipes $m$, $m^1$ or their connections 1 must be as near as possible to the ends of the cylinder $a$ for enabling as early a cut-off as possible to be effected. Consequently they are placed, as Fig. 8 shows in the compression space of the cylinder, i. e. at a point, where the piston in its movement, after passing the exhaust port $h^2$, compresses the remainder of the steam, which, as stated above, acts through the passage $n^1$ on the slide valve piston $e^3$ and thereby initiates the movement of the slide valve from the cut-off position shown in Fig. 8 into the extreme position. In the course of this movement the slide valve piston $e$ uncovers the pipe $m$ with its branch passage $r^2$ or brings it into communication with the circumferential groove $u^1$, so that the compression pressure produced under the power piston $b$ acts through $m$ and $r^2$, $u^1$, $x^1$, $y^1$ or directly through $m$ on the larger differential piston $e^1$. The reversing space $f^1$ cannot exhaust through the pipe $o$, as the latter is covered by the differential piston $e^1$. Consequently the compression pressure in the space $f^1$ will prevent the slide valve continuing its movement into the extreme position. The power piston during its further movement uncovers the branch passage $2^a$, so that the reversing space $f^1$ can exhaust through $m$ and $2^a$ into the cylinder, as in the movement of the slide valve described so far the part $d^1$ of the slide valve has uncovered the exhaust port $h^1$. Consequently the slide valve can reach its extreme position in the manner described above.

It should here be mentioned, that the power piston $b$ must be so thick that at the beginning of its movement it will cover the branch passage $2^a$ before it uncovers the connection 1 of the pipes $m$ or $m^1$, so that live steam cannot pass from 1 by way of $2^a$ in front of the piston.

It follows from what has been said above, that according to the present invention the movement of the slide valve is divided into different phases characterized in the main by the reaching of the position, in which it cuts off the steam, and the extreme position. In the constructional form shown in Fig. 5 the former position is reached at once after the opened bore 1, 2 or 3 has been uncovered, while the transition to the extreme position is initiated by the compression in the cylinder and completed by live steam.

The constructional form shown in Figs. 7 and 8 shows a still further subdivision of the slide valve movement, the arrangement being such that, for determining the degree of cut-off, the slide valve movement is initiated by throttled steam, whereupon the slide valve is thrown into the cut-off position by unthrottled steam. From this position the slide valve is moved by the compression pressure into an intermediate position determined by the action of the compression on the other end of the slide valve, whereupon the entering live steam completes the slide valve movement.

The arrangement of the valves $p^1$, $p^2$ in the branch pipes $2^a$ of the pipes $m$, $m^1$ makes it possible to regulate the exhausting of the reversing spaces $f^1$ and $f^2$ by way of the steam cylinder, so that in these reversing spaces an accurately regulable steam cushion can be formed, which prevents the slide valve striking the cover too sharply.

While in the constructional form shown in Figs. 7 and 8 the regulation of the expansion is effected by throttling the working steam flowing into the reversing space $f^1$ or $f^2$, in the constructional form shown in Fig. 9 the same result is obtained by throttling the steam left in the reversing spaces $f^1$ and $f^2$. Consequently the throttle valves $t^3$, $t^4$ and the branch passages $r^2$, $r^3$ of the pipes $m$, $m^1$ are omitted. Instead the exhaust pipes $o$, $o^1$ are provided with throttle valves $v^3$, $v^4$ and branches $o^2$, $o^3$. In this arrangement the small differential pistons $e$ and $e^3$ have no bores, but the larger differential pistons $e^1$ and $e^2$ are each provided with a circumferential groove $w^1$ and $w^2$, which communicate with the bores $x^3$, $y^3$ and $x^4$, $y^4$, which connect the circumferential grooves to the reversing spaces $f^1$ and $f^2$.

By adjusting the valves $v^3$ and $v^4$ the commencement of the exhausting of the reversing spaces $f^1$ and $f^2$ can be delayed as desired, so that for instance the working steam flowing into the reversing space $f^2$ can only displace the slide valve gradually, owing to the delayed exhausting of the reversing space $f^1$, the desired cut-off being thus obtained.

On the circumferential groove $w^1$ of the piston $e^1$ reaching the branch $o^2$ for unthrottled steam, the reversing space $f^1$ is suddenly exhausted and the slide valve is suddenly thrown by the working steam acting in the reversing space $f^2$ into the cutting-off position. For the rest the slide valve operates exactly in the same manner as that described with reference to Figs. 7 and 8.

Thus in this case as well an essential feature is the gradual initiation of the slide valve movement for determining the cut-off and the subsequent sudden closing of the steam inlet to the cylinder.

Fig. 10 shows another modified form of the expansion slide valve gear according to Figs. 5 to 9, in which the stroke of the slide valve and consequently the inertia forces are reduced by the provision of a main steam outlet in the middle of the cylinder, while the ordinary outlet passages are made smaller and are used as auxiliary outlets.

The pipes $m$, $m^1$ are each connected, as in Figs. 5 and 6, to a cock casing $r^1$, the plug $s^1$ of which according to its position brings the pipe $m$ or $m^1$ into communication with one of the bores, 1, 2, 3 or 4, which open into the cylinder, so that steam can flow out of the cylinder $a$ behind the piston $b$ through one of the said bores, the cock casing $r^1$ and the pipe $m$ or $m^1$ into the reversing space $f^1$ or $f^2$.

The bulk of the exhaust steam escapes through the exhaust port $h$ in the middle of the cylinder wall. The exhaust ports $h^1$, $h^2$ near the ends of the cylinder $a$ are reduced in height and serve as auxiliary steam outlets and may be provided with throttle valves $t^5$, $t^6$ for obtaining a more fine regulation.

Assuming that the plugs $s^1$ are so adjusted that the pipes $m$, $m^1$ will receive steam from the cylinder $a$ through the bores $l$, then, if the piston $b$ is moving in the direction indicated by the arrow, the reversing space $f^2$ will receive cylinder steam immediately after the piston has commenced to move, so that the slide valve will be moved, as desired with reference to Figs. 5–9, into the position in which it cuts off the steam, in which position it covers the steam inlet port $a^3$, without of course uncovering $a^4$. The part $d^2$ of the slide valve at the same time immediately covers the exhaust port $h^2$, and, as the piston has moved over the port $h$ and closed it, the compression on the lower side of the piston will commence.

If, on the other hand, the plugs $s^1$ are so positioned that the bores 4 are caused to communicate with the pipes $m$, $m^1$, the reversing space $f^2$ will receive steam appreciably later for bringing the slide valve into the cut-off position. Consequently a greater quantity of exhaust steam will escape through the auxiliary exhaust port $h^2$. This port will be closed correspondingly later, the compression will begin later and will therefore only reach a very much lower degree.

As regards the utilization of the compression described above for completing the stroke of the slide valve it is assumed that the piston is sufficiently steam tight in the cylinder.

Should the piston become leaky, which cannot always be avoided, the compression required for the movement of the slide valve cannot be obtained in front of the piston. In order that the slide valve gear of the invention shall still work reliably in such an eventuality, in the constructional form shown in Fig. 12 additional auxiliary valves which are operated by the piston are provided, which supply live steam for moving the slide valve.

In this constructional form the pipes $m$, $m^1$ are connected to the steam cylinder each through a casing 25 which communicates with the steam cylinder $a$ through a plurality of bores 1, 2, 3 __, some or all of which are capable of being shut off or opened by means of the adjustable slide 26 in the casing 25, so that, by an earlier or later entry of cylinder steam through the pipes $m$, $m^1$ behind the larger differential piston $e^1$, $e^2$, the slide valve will be brought earlier or later into the position in which it shuts off the steam, for regulating or determining the cut-off.

A valve 27 is provided in each cylinder end $a^1$, $a^2$, which extends so far into the steam cylinder as to be lifted by the piston $b$, when the latter is still sufficiently far from the dead centre position. The valve 27 has a groove 28, with which communicates an aperture 29, which terminates in a circumferential groove 30. A spring 31, which abuts against an adjustable screw 32, loads the valve 27 adjustably, so that the latter takes up the normal position shown at the lower end of Fig 12, in which position the valve 27 rests tightly on its seat and at the same time shuts off the passage 33 leading to the passage $n$ or $n^1$.

On the piston $b$ during its downward stroke striking against the valve 27 and forcing it downwards, so that finally with the piston in the dead centre position it occupies the position shown at the upper end of Fig. 12, live steam will flow through the groove 28, the aperture 29 and the groove 30 of the valve into the auxiliary passage 33 and thence through the passage $n^1$ (or $n$) into the reversing space $f^3$ (or $f$) behind the differential piston $e^3$ (or $e$), so that the slide valve is thrown suddenly and quickly into its extreme position.

On the return stroke of the piston $b$ taking place, the opened valve 27 is closed by the steam pressure acting on it and by the spring 31, so that no more live steam can enter at this point. The spring 31 is required, as the steam pressure by itself would only close the valve on there being a drop in pressure in the cylinder after the commencement of the expansion.

It follows from the above that the provision of the two valves 27 ensures the slide valve reversing when the power piston is in the dead centre position.

In normal working conditions, i. e. when the piston is steam tight and the engine is running at sufficient speed the valve 27 will cause the slide valve always to open very quickly and as late as possible, owing to the supply of live steam provided by it, which has a favorable effect on the steam consumption of the engine.

The valve 27 also acts as a safety valve in cases of water hammer. For this purpose the spring load on the valve is made so high that a pressure above the working pressure is required for opening the valve. In ordinary working this high pressure is replaced by the piston $b$ acting towards the end of its stroke directly on the valve 27, so that the valve opens in the manner described. When, however, on water hammer occurring, there is a sudden great increase in pressure, the spring load on the valve will be overcome and the valve will open. The high compression pressure in the cylinder can then escape either through the passage $n$ or $n^1$, the passage 33 and by way of the valve 27 into the steam space or the slide valve is immediately reversed by steam entering the corresponding reversing space $f$ or $f^3$, so that the excessive pressure can become equalized by way of the inlet ports $a^3$ or $a^4$ with the working pressure. The provision of the valves 27 thus prevents the cylinder being destroyed by water hammer thus increasing the general reliability of the engine.

It is seen from Fig. 12 that the live steam admitted by the opened valve 27 can flow through the passage $n$ or $n^1$ not only, as already described, to the reversing spaces $f$ or $f^3$, but also into the cylinder $a$, even when for instance for stopping the engine all the bores 1, 2, 3 __ are closed by their slides 26.

This is, however, unobjectionable, as in the normal position of the engine, passages $n$, $n^1$ are covered before the slide valve reaches its cut-off position, that is during the admission period, by the auxiliary valves returning to their seats. When all the bores 1, 2 __ are closed, the slide valve cannot be reversed and if the main stop valve should then be opened, live steam might enter behind the piston through one of the valves 27 being held open by the piston when the latter is in the dead centre position (see Figure 12, top end). This quantity of steam is however only small, as the piston releases the valve after moving only a short distance, so that the valve will close. In addition to this, the bores 1, 2 __ being closed, the slide valve will not have been reversed, so that the steam outlet is open on the steam inlet side. Thus this quantity of steam could only move the piston $b$ until it uncovers the steam outlet, whereupon the steam will escape to the outside. Hence, even if the main steam valve should be open, by closing the cut-off regulator (for the bores 1, 2—) the engine would immediately stop.

The increased admission to the reversing spaces $f$ or $f^3$ by means of the live steam passing through the valve 27 and the consequent acceleration of the slide valve movement renders it necessary to provide for an equal acceleration in exhausting the opposite reversing space $f^3$ or $f$. For this purpose in this constructional form of the invention the exhaust ports $h^1$, $h^2$ are provided with branch passages $h^3$, $h^4$, which are open to the cylinder $a$. The outlets into the cylinder of these branch passages $h^3$, $h^4$ are so placed that they are uncovered by the piston $b$ when in the dead centre position, while the corresponding steam outlet $h^1$ or $h^2$ is covered by the piston. Hence, before the reversal of the slide valve the cylinder space behind the piston and through the passage $n$ or $n^1$ the corresponding reversing space $f^3$ or $f$ can start to exhaust, so that, when the piston for instance reaches the lower dead centre position shown in broken lines in Fig. 12, the cylinder space above the piston and through the passage $n$ the reversing space $f$ will have been at least partially exhausted through $h^4$, so that the slide valve (in Fig. 12) can be moved up rapidly. The part $d^2$ of the slide valve will then cover the exhaust port $h^2$ and consequently the branch passage $h^4$ as well.

The branch passages $h^3$, $h^4$ also act with advantage, when the engine is working with full admission. In that case the pressure in the two reversing spaces $f$ and $f^3$ would be approximately equal, so that the further movement of the slide valve would be uncertain. The branch passages, however, exhaust these reversing spaces alternately in the manner described above, so that the piston can work unhindered.

For the purpose of determining the direction of rotation with the rodless slide valve gear according to the present invention, for instance for reversing the engine from going forwards to going backwards, the invention provides a special reversing device, which enables this reversal of the engine to be effected in a very simple manner by a simple manipulation. This reversing device preferably takes part in the starting of the engine as well by moving the slide valve to and fro during the first strokes, until slide valve and slide valve casing are sufficiently warmed up for preventing condensation of the cylinder steam used in the manner described above for moving the slide valve.

The reversing device is shown in section in Fig. 11. It consists substantially of a slide valve casing 6, which is divided by a wall 7 into two chambers 8 and 9, in one of which a distributing slide valve 10 and in the other a controlling valve 11 is capable of sliding. To the chamber 8 of the distributing valve 10 is connected the steam inlet branch 12 and the steam outlet branch 13, while two pipes 14 lead from the chamber 9 of the controlling valve 11, one of which is connected to the pipe $t$ indicated in Fig. 1 and the other to the pipe $t^1$ in the same figure, so that through these pipes live steam can be conveyed by way of the reversing device to the reversing spaces $f$ and $f^3$ of the slide valve.

The distributing slide valve, which has a longitudinal bore 15, is connected by means of a rod 16 to a connecting rod 17, the crank disc 18 of which is turned by a connecting manner 19, which is connected in any suitable manner to the steam engine, such that it moves together with the power piston $b$ of the steam engine. The controlling valve, which is also provided with a longitudinal bore 20 is capable of being adjusted by means of a rod 21 from the outside. The two chambers 8 and 9 are in communication with one another through the two ports 22 and 23 in the wall 7.

The reversing device described above operates as follows:—

The controlling valve 11 is set for the engine to go forward. Through the inlet branch 12, which is connected to the boiler by a pipe, not shown in the figure, live steam passes through the valve 10, the chamber 8 and the port 23 into the chamber 9 and thence through the bore 20 of the controlling valve 11 to the left-hand pipe 14, which is connected to the pipe $t$ at the top end of the reversing space $f$ of the slide valve (Fig. 1). The slide valve is thus moved downwards in correspondence with the motion of the power piston $b$ in the steam cylinder. At the same time the distributing valve 10 will have moved from the position shown in full lines into that shown in broken lines in Fig. 11. In the course of this movement it will first have covered the two ports 22 and 23 and thereby interrupted the flow of steam from the chamber 8 into the chamber 9 and finally have taken up a position, in which the steam passes from the chamber 8 or the slide of 10 through the port 22 into the chamber 9 or the slide of 11 and to the right-hand branch 14. This pipe, as already stated, is connected to the pipe $t^1$ leading to the lower reversing space $f^3$ of the slide valve $d$. The steam enters the reversing space $f^3$ (or $f^2$) and moves the slide valve $d$ in the opposite direction, i. e. upwards. During this movement the reversing space $f$ (or $f^1$) of the slide valve is exhausted through the pipe $t$, the left-hand branch 14, the bore 20 of the controlling valve 11, the port 23, the chamber 8 and the exhaust branch 13.

The distributing valve 10 will by this time have again reached the position shown in full lines (Fig. 11) corresponding to the motion of the power piston $b$, whereupon the sequence of operations commences afresh. During the downward movement of the slide valve $d$ the reversing space $f^3$ (or $f^2$) is exhausted through the pipe $t^1$, the right-hand branch 14 of the reversing device, the chamber 9 or the slide of 11, the port 22, the bore 15 of the distributing valve and the chamber 8 to the exhaust branch 13.

When the controlling valve 11 is brought to the middle position (stop), it will close the ports 22, 23 in the wall 7, so that no steam will reach the pipes $t$, $t^1$. The slide valve $d$ will then either remain stationary or, if the engine is running, the slide valve $d$ will be moved in the manner described above by cylinder steam and live steam.

In order to reverse the engine, the controlling valve 11 is moved into the position shown by broken lines in Fig. 11. In this position the right-hand branch 14 and the pipe $t^1$ connected to it will first receive live steam, when the distributing valve 10 has reached the position shown.

On starting the engine the slide valve $d$ is moved during the first few strokes in the manner just described by way of the reversing device shown in Fig. 11, until the slide valve casing $c$ and the slide valve $d$ are sufficiently heated. The controlling valve 11 is thereupon set to the middle position (stop), whereby the reversing device is put out of action. The engine with its slide valve $d$ will then run forwards in the manner described above. For reversing the engine it is only necessary to set the controlling valve 11 into the position shown in broken lines in Fig. 11.

What I claim is:—

1. A fluid actuated valve for reciprocating engines, comprising in combination a slide valve having two differential pistons, one at each end of the slide valve, each differential piston being constituted by a larger and a smaller part, means controllable by the smaller part of either differential piston for supplying steam from the cylinder of the engine to the said larger part of the differential piston for initiating the movement of the slide valve, said smaller part being capable of cutting off the supply of cylinder steam to the larger part immediately after the initiation of the movement of the valve, and means for supplying live steam to the smaller part of the same differential piston after the initiation of the movement of the slide valve for completing the movement of the slide valve, as set forth.

2. A fluid actuated valve for reciprocating engines, as claimed in claim 1, and having means for exhausting the cylinder steam after it has acted on the larger piston of the valve, as set forth.

3. A fluid actuated valve for reciprocating engines, as claimed in claim 1, and having "reversing spaces" ($f^1$, $f^2$) adjacent to the larger pistons ($e^1$, $e^2$) of the valve, which "reversing spaces" are in open communication with the means ($m$) supplying cylinder steam thereto, which open communication is capable of being closed by the smaller piston of the valve and pipes ($o$) for exhausting the "reversing spaces", which latter pipes are capable of being opened by the larger pistons ($e^1$, $e^2$) of the valve, as set forth.

4. A fluid actuated valve for reciprocating engines, as claimed in claim 1, and having "reversing spaces" ($f$, $f^3$) adjacent to the smaller pistons ($e$, $e^3$) of the valve, the means for supplying live steam to the spaces consisting of passages ($n$, $n^1$), which are connected to the power cylinder so as to be capable of receiving live steam by way of the power cylinder for moving the slide valve and are connected to the reversing spaces ($f$, $f^3$) at a point thereof beyond which the small pistons are capable of moving during the movement of the valve by steam admitted to the differential piston at the opposite end for cushioning the impact of the slide valve, as set forth.

5. A fluid actuated valve for reciprocating engines, as claimed in claim 1, and having exhaust ports ($h$) in the power cylinder and "reversing spaces" ($f^1$, $f^2$) adjacent to the larger pistons ($e^1$, $e^2$) of the valve and pipes ($o$) in open communication with said "reversing spaces" for exhausting said reversing spaces, said pipes being connected to the reversing spaces at the part thereof in which the said larger pistons lie when the reversing spaces are in open communication with the means ($m$) for supplying cylinder steam to the reversing spaces, so as to enable the larger pistons to close the said open communication between the pipes ($o$) and the reversing spaces, as set forth.

6. A fluid actuated valve for reciprocating engines, comprising in combination a slide valve having two differential pistons, one at either end of the slide valve, each differential piston being constituted by a larger and a smaller part, means controllable by the smaller part of either differential piston for supplying steam from the cylinder of the engine to the said larger part of the differential piston for initiating the movement of the slide valve, said smaller part being capable of cutting off the supply of cylinder steam to the larger part immediately after the initiation of the movement of the valve, and means for supplying live steam through the cylinder to the smaller part of the same differential piston after the initiation of the movement of the slide valve for completing the movement of the slide valve, as set forth.

7. A fluid actuated valve for reciprocating engines, comprising in combination a slide valve having two differential pistons, one at either end of the slide valve, each differential piston being constituted by a larger and a smaller part, means comprising pipes ($m$, $m^1$) for supplying steam from the cylinder of the engine to the said larger part of either differential piston for initiating the movement of the slide valve, said pipes crossing each other and being connected to the cylinder in proximity to the cylinder ends, and means for supplying live steam to the smaller part of the same differential piston for completing the movement of the slide valve, as and for the purpose set forth.

8. A fluid actuated valve for reciprocating engines as claimed in claim 7 and having a plurality of ports in the engine cylinder, said ports extending one behind the other in the longitudinal direction of the cylinder and being in open communication with the pipes ($m$, $m^1$) for supplying steam from the engine cylinder to the larger part of either differential piston and means capable of closing the open communication between said ports and the pipes ($m$, $m^1$).

9. A fluid actuated valve for reciprocating engines, comprising in combination a slide valve having two differential pistons, one at either end of the slide valve, each differential piston being constituted by a larger and a smaller part, reversing spaces adjacent to the larger pistons ($e^1$, $e^2$) of the valve, pipes ($m$, $m^1$) for supplying steam from the cylinder of the engine to the said larger part of either differential piston for initiating the movement of the slide valve, pipes ($o$) for exhausting said reversing spaces, which pipes are capable of being opened by the said larger pistons, means for regulating the outflow of fluid through the pipes ($o$) so as to regulate the speed of the initial movement of the slide valve and means for supplying live steam to the smaller part of the same differential piston for completing the movement of the slide valve, as set forth.

10. A fluid actuated valve for reciprocating engines as claimed in claim 7 and having exhaust ports in the engine cylinder capable of being covered by the power piston of the engine before the said power piston reaches the end of its stroke for enabling the slide valve to be mounted by steam compressed by the power piston before the movement of the valve is completed by live steam admitted to the smaller part of the differential piston, as set forth.

11. A fluid actuated valve for reciprocating engines as claimed in claim 7, and having "reversing spaces" ($f$ and $f^3$) behind the smaller differential pistons ($e$ and $e^3$) and valves (27) for admitting live steam into the reversing spaces ($f$ and $f^3$), said valves being capable of being opened by the power piston in the engine cylinder on said piston reaching its dead centre position, as set forth.

12. A fluid actuated valve for reciprocating engines as claimed in claim 7, and having "reversing spaces" ($f$ and $f^3$) behind the smaller differential pistons ($e$ and $e^3$), valves (27) for admitting live steam into the reversing spaces ($f$ and $f^3$), said valves being capable of being opened by the power piston in the engine cylinder on said piston reaching its dead centre position and adjustable springs provided on the valves (27), said springs being capable of exerting a pressure greater than the ordinary working pressure of the steam in the cylinder of the engine, as set forth.

13. A fluid actuated valve for reciprocating engines as claimed in claim 7 and having exhaust ports in the engine cylinder capable of being covered by the power piston of the engine before the said power piston reaches the end of its stroke for enabling the slide valve to be moved by steam compressed by the power piston before the movement of the valve is completed by live steam admitted to the smaller part of the differential piston and branch passages ($h^3$, $h^4$) in open communication with the said exhaust ports and with the engine cylinder and capable of being uncovered by the piston when at the end of its stroke, as and for the purposes set forth.

14. A fluid actuated valve for reciprocating engines as claimed in claim 7 and having a casing in open communication with the pipes ($m$, $m^1$) for supplying steam from the engine cylinder to the larger part of either differential piston, a plurality of ports in the engine cylinder, said ports being in open communication with the said casing and extending one behind the other in the longitudinal direction of the cylinder, and a valve inside said casing, said valve being capable of displacement so as to obstruct the outlet of steam through one or more of said ports from the engine cylinder into said casing for varying the admission of steam to the pipes ($m$, $m^1$), as set forth.

In testimony whereof I have signed my name to this specification.

FRITZ TOLKIEN.